(12) United States Patent
Sambhwani et al.

(10) Patent No.: US 9,172,486 B2
(45) Date of Patent: Oct. 27, 2015

(54) APPARATUS AND METHOD FOR TIME-DIVISION MULTIPLEXING OF DEDICATED CHANNEL

(71) Applicant: QUALCOMM Incorporated, San Diego, CA (US)

(72) Inventors: Sharad Deepak Sambhwani, San Diego, CA (US); Peyman Razaghi, San Diego, CA (US); Sony J. Akkarakaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 13/830,118

(22) Filed: Mar. 14, 2013

(65) Prior Publication Data

US 2013/0343351 A1     Dec. 26, 2013

Related U.S. Application Data

(60) Provisional application No. 61/663,386, filed on Jun. 22, 2012.

(51) Int. Cl.
*H04J 3/12* (2006.01)
*H04B 7/26* (2006.01)

(52) U.S. Cl.
CPC .............. *H04J 3/12* (2013.01); *H04B 7/2618* (2013.01)

(58) Field of Classification Search
CPC ........................................................ H04J 3/12
USPC ........................................................ 370/336
See application file for complete search history.

(56) References Cited

U.S. PATENT DOCUMENTS

| RE42,744 E * | 9/2011 | Malkamaki et al. ........... 370/282 |
| 8,280,425 B2 | 10/2012 | Love et al. |
| 2003/0026235 A1 * | 2/2003 | Vayanos et al. ............... 370/342 |
| 2005/0053035 A1 | 3/2005 | Kwak et al. |
| 2005/0099968 A1 | 5/2005 | Yamano |
| 2006/0221908 A1 * | 10/2006 | Hoshina ........................ 370/335 |
| 2007/0049307 A1 | 3/2007 | Mueckenheim et al. |
| 2008/0159324 A1 | 7/2008 | Bosch et al. |
| 2009/0232052 A1 * | 9/2009 | Black et al. .................... 370/328 |

(Continued)

FOREIGN PATENT DOCUMENTS

GB     2391427 A     2/2004

OTHER PUBLICATIONS

Casoni M., et al., "Admission Control in T/CDMA Systems Supporting Voice and Data Applications", IEEE Transactions on Wireless Communications, IEEE Service Center, Piscataway, NJ, US, vol. 1, No. 3, Jul. 1, 2002, XP011080872, ISSN: 1536-1276 abstract p. 541, right-hand column, line 1-line 57.

(Continued)

*Primary Examiner* — Charles C Jiang
*Assistant Examiner* — Thad Defauw
(74) *Attorney, Agent, or Firm* — Charles Chesney

(57) ABSTRACT

Disclosed are apparatus and method for time division multiplexing of a dedicated channel. In one aspect, the apparatus and method are configured to assign a common spreading code to two or more User Equipments (UEs); encode a downlink (DL) dedicated channel (DCH) with the common spreading code; time-division multiplex a Dedicated Physical Data Channel (DPDCH) data for each of the two or more UEs on the encoded DL DCH; and transmit the multiplexed data on the DL DCH to the UEs.

25 Claims, 9 Drawing Sheets

(56) References Cited

U.S. PATENT DOCUMENTS

2010/0113004 A1* 5/2010 Cave et al. .............. 455/422.1
2011/0085521 A1   4/2011 Terry
2012/0113825 A1* 5/2012 Baglin et al. ............. 370/252

OTHER PUBLICATIONS

International Search Report and Written Opinion—PCT/US2013/046433—ISA/EPO—Oct. 4, 2013.

* cited by examiner

APPARATUS AND METHOD FOR TIME-DIVISION MULTIPLEXING OF DEDICATED CHANNEL

CLAIM OF PRIORITY UNDER 35 U.S.C. §119

The present application for patent claims priority to Provisional Application No. 61/663,386 entitled "Apparatus and Method for Time Division Multiplexing of the Dedicated Channel" and filed on Jun. 22, 2012, and assigned to the assignee hereof and hereby expressly incorporated by reference herein.

BACKGROUND

1. Field

Aspects of the present disclosure relate generally to wireless communication systems, and more particularly, to apparatus and method for time-division multiplexing of a dedicated channel.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

The talk time of UTRAN User Equipment (UE) still lags that of 2G devices considerably. Any technique that allows a UE to turn off the receiver and transmitter during a voice call, leads to UE modem battery savings. Furthermore such opportunities should not come at the expense of degrading link efficiency or coverage performance. Accordingly, there is a need to improve talk time of UTRAN UE devices.

SUMMARY

The following presents a simplified summary of one or more aspects of systems, methods and computer program products for time-division multiplexing of a dedicated channel. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In one aspect, a method for time-division multiplexing of a dedicated channel (DCH) includes assigning a common spreading code to two or more UEs. The method further includes encoding a downlink (DL) DCH with the common spreading code. The method further includes time-division multiplexing a Dedicated Physical Data Channel (DPDCH) data for each of the two or more UEs on the encoded DL DCH. The method further includes transmitting the multiplexed data on the DL DCH to the UEs.

In another aspect, an apparatus for time-division multiplexing of a DCH includes a spreading code assignor configured to assign a common spreading code to two or more UEs. The apparatus further includes an encoder configured to encode a DL DCH with the common spreading code. The apparatus further includes a multiplexer configured to time-division multiplex a DPDCH data for each of the two or more UEs on the encoded DL DCH. The apparatus further includes a transmitter configured to transmit the multiplexed data on the DL DCH to the UEs.

In another aspect, an apparatus for time-division multiplexing of a DCH includes means for assigning a common spreading code to two or more UEs. The apparatus further includes means for encoding a DL DCH with the common spreading code. The apparatus further includes means for time-division multiplexing a DPDCH data for each of the two or more UEs on the encoded DL DCH. The apparatus further includes means for transmitting the multiplexed data on the DL DCH to the UEs.

In another aspect, a non-transitory computer-readable medium comprising code for time-division multiplexing of a DCH, including codes for assigning a common spreading code to two or more UEs. The medium further includes codes for encoding a DL DCH with the common spreading code. The medium further includes codes for time-division multiplexing a DPDCH data for each of the two or more UEs on the encoded DL DCH. The medium further includes codes for transmitting the multiplexed data on the DL DCH to the UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
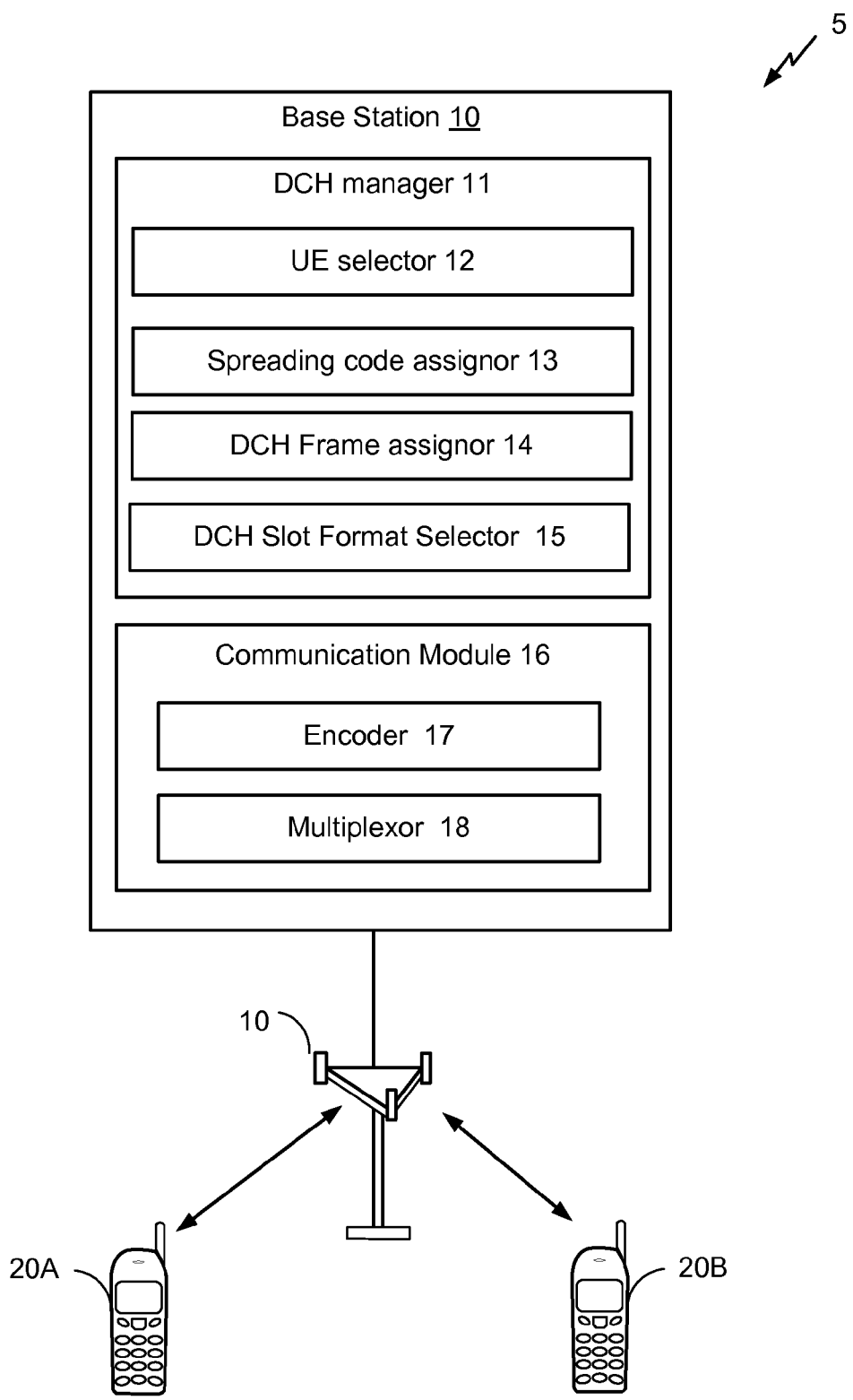
FIG. 1 is a block diagram illustrating of a UTRAN communication system according to one aspect of the present invention.

FIG. 1 illustrates a diagram of UTRAN communication system in accordance with one aspect of the present invention. The communication system 5 includes one or more base stations 10 (e.g., NodeB) communicating with multiple UEs 20a and 20b. A base station (BS) 10 is operable to support circuit switched (CS) voice calls on a dedicated channel (DCH) with the UEs 20a and 20b using WCDMA technology. Generally, in a WCDMA system, a BS assigns different spreading codes, such as Orthogonal Variable Spreading Factor (OVSF) codes, to each of the UEs 20a and 20b. These spreading codes (also known as channelization codes) are used by the UEs and BS to encode (spread) signals transmitted on the DCH between each other, so that the signals can be decoded (despreaded) at the receiver without interference with other signals transmitted to/from BS and other UEs on the WCDMA network. However, in one aspect, a single spreading code may be shared in time between UEs 20a and 20b and downlink (DL) transmissions from the BS 10 to each of the UEs 20a and 20b can be time division multiplexed to enhance UE modem battery savings during CS voice call.

In one aspect, the BS 10 may be configured to assign a common spreading code to two or more UEs 20a and 20b and have these UEs share the same downlink (DL) Dedicated Physical Data Channel (DPDCH) encoded using the common spreading code. To distinguish between DPDCH transmissions to each of the UEs 20a and 20b, the data to each UE can be sent by the BS 10 on alternate DCH frames. For example, the BS 10 can send DPDCH data to UE 20a on odd-indexed DCH frames and send DPDCH data to UE 20b on even-indexed DCH frames. In turn, UE 20a can be configured to decode only transmissions on the odd-indexed DPDCH frames, and UE 20b can be configured to decode only transmissions on the even-indexed DPDCH frames. This enables each UE to DRX (Discontinuous Reception) the downlink DPDCH transmissions in alternate DCH frames during CS voice calls and to turn off its receiver circuitry during off-frames. In other words, UE 20a may turn off its receiver during even-indexed DCH frames (off-frames for UE 20a), and UE 20b may turn off its receiver during odd-indexed DCH frames (off-frames for UE 20b). The turning off of the UE receiver every other frame improves UE's modem power savings.

In another aspect, the BS 10 may be further configured to transmit Dedicated Physical Control Channel (DPCCH) data to each of the UEs 20a and 20b in every DCH frame. In turn, UEs 20a and 20b may continuously monitor the DPCCH information every slot in all the DCH frames. For example, the DPCCH data for each of the UEs 20a and 20b may be either time-division multiplexed with its DPDCH on the same spreading code or is mapped to a different spreading code by the BS 10. In one aspect, DPCCH data can include only Uplink (UL) Transmit Power Control (TPC) bits.

To implement the above communication mechanism, the BS 10 in FIG. 1 may include a DCH manager 11 configured to manage downlink DPDCH and DPCCH transmissions to UEs 20a and 20b. In one aspect, the DCH manager 11 may include a UE selector 12 configured to select two or more UEs currently served by the BS 10, such as UEs 20a and 20b, to communicate on the same DCH channel. The DCH manager 11 may also include a spreading code assignor 13, which assigns a common spreading code to the DCH channel for UEs 20a and 20b. The DCH manager 11 may also include a DCH frame assignor 14 configured to select frame assignment for each of the UEs 20a and 20b. For example, UE 20a may be assigned odd-indexed DCH frames and UE 20b may be assigned even-indexed DCH frames. The DCH manager 11 may also include a DCH slot format selector 14 configured to select DCH slot format for each of the UEs 20a and 20b. Several examples of possible DCH slot formats will be described next with reference to Table 1 and FIG. 2. Lastly, the BS 10 may include a communication module 16, such as a RF transmitter, configured to transmit DCH frames to the UEs 20a and 20b. In one aspect, the communication module 16 includes an encoder 17 configured to encode a DL DCH with the common spreading code, and a multiplexor 18 configured to time-division multiplex the DPDCH and DPCCH data for the UEs 20a and 20b on the DL DCH frames for transmission to the UEs. In other aspects, the BS 10 may include other components described throughout this disclosure.

Table 1 shows several examples of downlink DCH slot formats that may be assigned to UEs 20a and 20b by the DCH slot format selector 14 of the DCH manager 11 of the BS 10 in various aspects of the present invention.

TABLE 1

| | | | | | | | | | | |
|---|---|---|---|---|---|---|---|---|---|---|
| | | | DCH slot formats | | | | | | | |
| Slot Format #i | Channel Bit Rate (kbps) | Channel Symbol Rate | SF | Bits/ Slot | DPDCH Bits/Slot $N_{Data1}$ | $N_{Data2}$ | $N_{TPC}$ | DPCCH Bits/Slot $N_{TFC}$ | $N_{Pilo}$ | Transmitted slots per radio frame |
| 17 | 60 | 30 | 128 | 40 | 4 | 32 | 4, last 2 are DTXed | 0 | 0 | 15 |
| 18 | 60 | 30 | 128 | 40 | 4 DTX | 32 DTX | 4, last 2 are DTXed | 0 | 0 | 15 |

TABLE 1-continued

DCH slot formats

| Slot Format #i | Channel Bit Rate (kbps) | Channel Symbol Rate | SF | Bits/ Slot | DPDCH Bits/Slot | | | DPCCH Bits/Slot | | | Transmitted slots per radio frame |
|---|---|---|---|---|---|---|---|---|---|---|---|
| | | | | | $N_{Data1}$ | $N_{Data2}$ | $N_{TPC}$ | $N_{TFC}$ | $N_{Pilo}$ | | |
| 19 | 60 | 30 | 128 | 40 | 4 | 32 | 4, first 2 are DTXed | 0 | 0 | | 15 |
| 20 | 60 | 30 | 128 | 40 | 4 DTX | 32 DTX | 4, first 2 are DTXed | 0 | 0 | | 15 |

All these slot formats have certain positions that are always DTXed. UEs may be assigned one slot-format for all DCH frames with even Connection Frame Number (CFN), and another distinct slot-format for all DCH frames with odd CFN.

Figure 2:
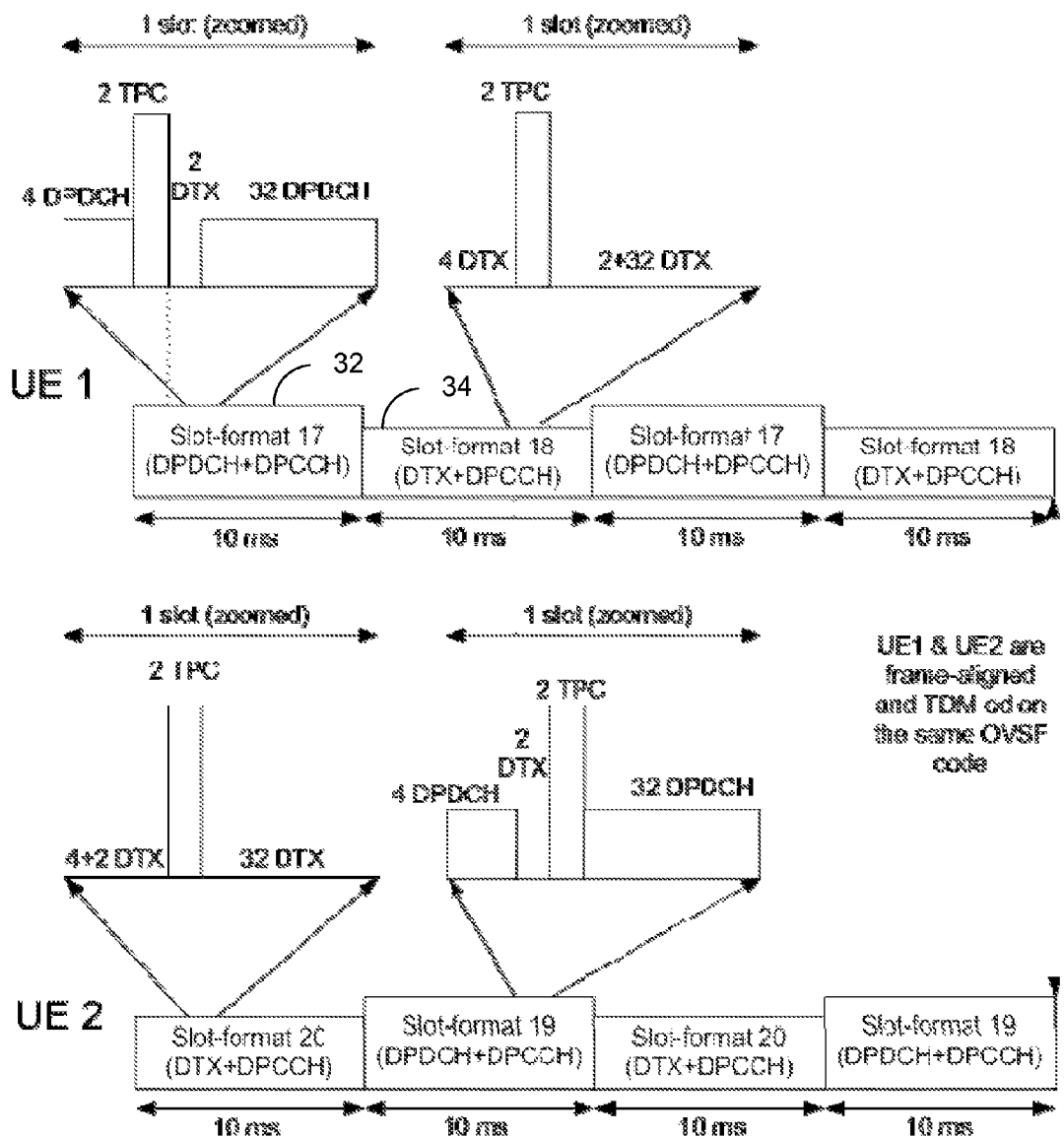
FIG. 2 is a diagram illustrating an example of time-division multiplexing of a DCH between two UEs according to one aspect.

FIG. 2 shows examples of time-division multiplexing mechanisms of a DCH between UE 1 and UE 2 according to one aspect. The slot-formats for the even and odd CFNs for any given UE may be chosen from either the pair (17, 18) or the pair (19, 20) of DCH slot format in Table 1. As shown in the zoomed view of slot formats in FIG. 2, slot formats 17 and 19 carry both DPDCH and DPCCH data (4 DPDCH slots, 2 TPT slots, 2 empty DTX slots, and 32 DPDCH slots), while slot formats 18 and 20 carry only DPCCH data (2 TPC slots), with DTX in place of the DPDCH. Thus, DPDCH transmissions for each UE are only carried in every alternate DCH frame.

In one aspect, transmissions on alternate DCH frames could be specified similarly to low category High-Speed Downlink Packet Access (HSDPA) protocol UEs, where "Minimum inter-TTI interval in HS-DSCH" defines the distance from the beginning of the Transmission Time Internal (TTI) to the beginning of the next TTI that can be assigned to the UE. Such a parameter could be signaled in conjunction with the new DL DPCH slot formats by BS 10. In addition, BS 10 may signal a 1-bit parameter to indicate whether the UE should receive DL DPDCH on even or odd CFNs. Furthermore, the TPC fields of these new slot formats may be also divided into two equal-length sequential parts, of which one part may contain DTX and the other may contain the TPC bits. In addition, the non-DTX part of the TPC field could also carry an Ack symbol that can be I-Q multiplexed with the TPC symbol.

As seen from the zoomed views of slot formats 17 and 20 in FIG. 2, if the BS 10 transmits time-aligned DCH frames to two UEs 1 and 2, one using slot-format 17 and the other using slot-format 20, then these transmissions are orthogonal in time. The same applies if one transmission uses slot-format 18 and the other uses slot-format 19. Thus, these slot-formats allow DCH transmissions to two UEs 20a and 20b to be time-division multiplexed using a common spreading code, as illustrated in FIG. 2.

Figure 3:
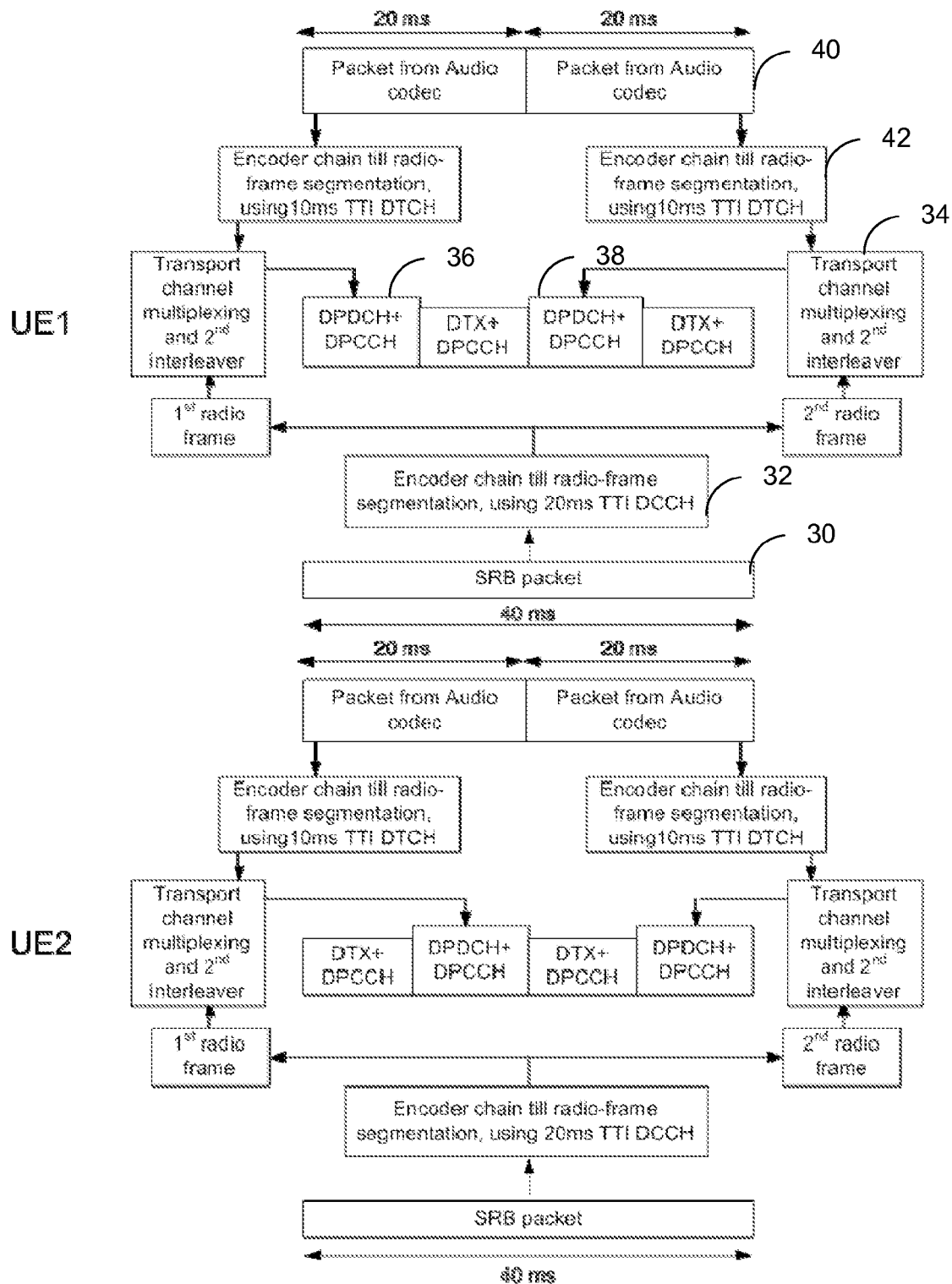
FIG. 3 is a diagram illustrating an example of time-division multiplexing of DTCH and DCCH according to one aspect.

Since DPDCH carrying Dedicated Traffic Channel (DTCH) data and Dedicated Control Channel (DCCH) data is only transmitted in alternate radio frames, the transport channel multiplexing procedure may also change as shown in FIG. 3. For example, Signaling Radio Bearers (SRB) packets 30 generated once every 40 ms by BS 10 may now be encoded using a 20 ms TTI (block 32). Concurrently, 20 ms audio packets from Audio codec 40 may be encoded using 10 ms TTI DTCH (block 42). The two constituent 10 ms radio-frames of the 20 ms TTI are multiplexed with two successive DTCH voice-frame packets (block 34), and sent on two alternate DCH frames (36, 38).

It should be noted that the above-described DCH multiplexing mechanism is not limited to two UEs, but can be easily scaled to three or more UEs. For example, in a case of three UEs, the DCH manager 11 can assign DCH frames 0, 3, 6, . . . to transmit DPDCH data for UE1, assign DCH frames 1, 4, 7, . . . to transmit PDPCH data for UE2, and assign frames 2, 5, 8, . . . to transmit DPDCH data for UE3, and so on. In other words, the DCH manger 11 will time-division multiplex the DPDCH data for each of the three or more UEs on sequential DCH frames. For example, DPDCH data for UE1 is multiplexed on DCH frame 1; DPDCH data for U2 is multiplexed on the DCH frame 2; DPDCH data for U3 is multiplexed on the DCH frame 3, and so on. Also, as explained above, with two UEs, the new DCH multiplexing scheme uses a packet transmission duration (e.g., TTI) which is half of that used in the current UMTS standard. With N UEs (where N is at least three), the new TTI may have to be divided by N.

Figure 4:
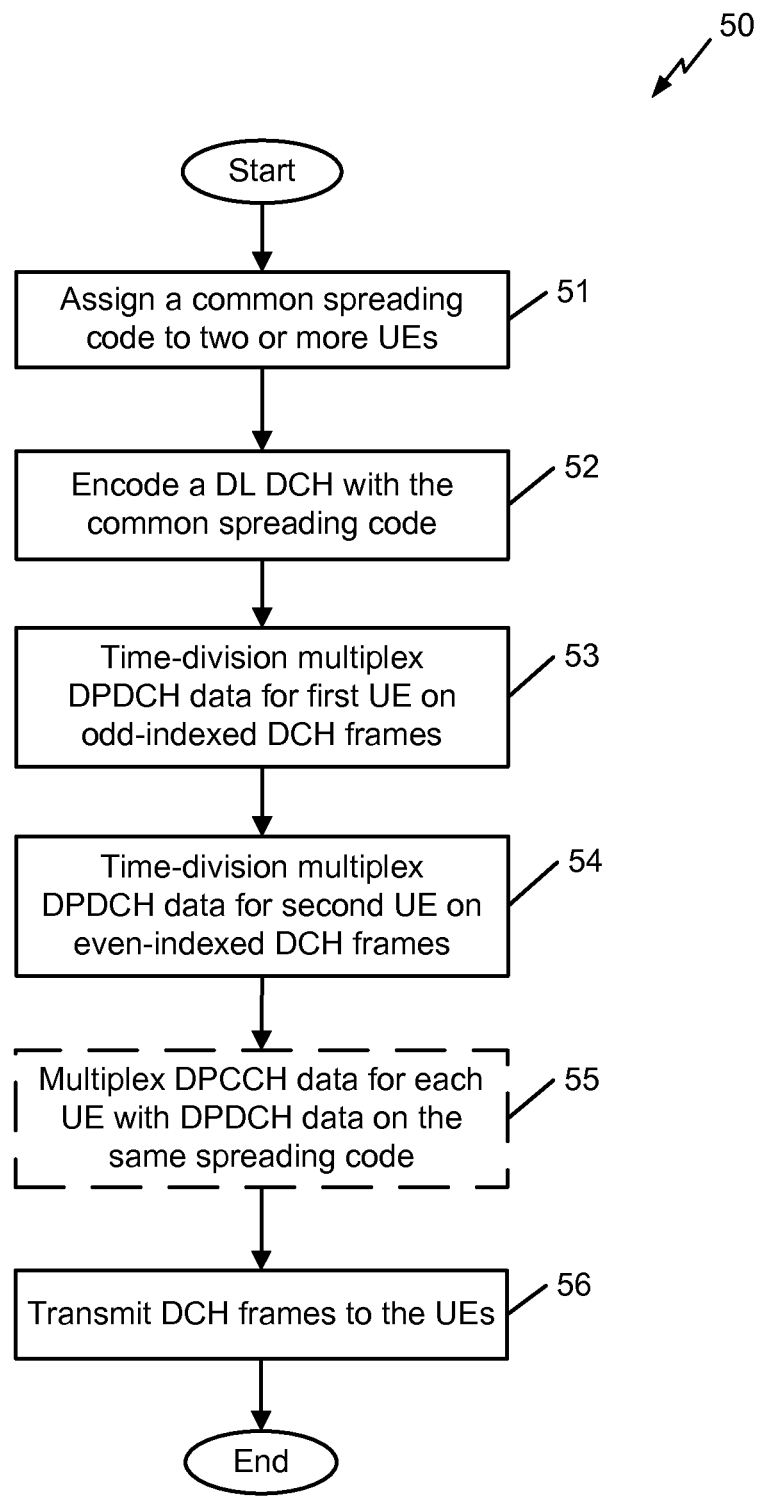
FIG. 4 is a flow diagram illustrating an example methodology of time-division multiplexing of the DCH according to one aspect.

FIG. 4 is an example methodology of time-division multiplexing of DCH according to one aspect. At step 51, method 50 includes assigning a common spreading code to two or more UEs. For example, in one aspect, spreading code assignor 13 of the DCH manager 11 of the BS 10 of FIG. 1 may be configured to assign a common spreading code to two or more UEs 20a and 20b. At step 52, the method 50 includes encoding a DL DCH with the common spreading code. In one aspect, the encoder 17 of the communication module 16 of the BS 10 may be configured to perform encoding of the DL DCH. At steps 53, the method 50 includes time-division multiplexing DPDCH data for the first UE on odd-indexed DCH frames. At step 54, the method 50 includes time-division multiplexing DPDCH data for the second UE on even-indexed DCH frames. In one aspect, the multiplexor 18 of the communication module 16 of the BS 10 may be configured to perform this time-division multiplexing process. At step 55, the method 50 (optionally) includes multiplexing DPCCH data for each UE with DPDCH data on the same spreading code. In one aspect, the multiplexor 18 may be configured to multiplex DPCCH data for the UEs 20a and 20b on the alternative off-frames. At step 56, the method 50 includes transmitting DCH frames to the UEs over RF channel. In one aspect, transmitter 16 of the BS 10 may transmit DCH frames using RF signals.

On the UE side, each of the UEs 20a and 20b is configured by the BS 10 to listen on the respective odd or even-indexed DCH frames for DPDCH data and for DPCCH data on alternate off-frames. Alternatively, to saver battery power, UEs 20a and 20b may turn off their RF receiver circuitry during alternate off-frames. Additional power saving can be achieved by UEs 20*a* and 20*b* using early decoding of voice frames on both the downlink and uplink DCHs. Particularly, both BS and UEs 20*a* and 20*b* may signal an ACK to the BS 10 when they successfully decode one or more data packets even without receiving all of the DCH frames constituting the decoded packet. Then, the receiver and transmitter at both BS 10 and UEs 20*a* and 20*b* may be turned off when the voice frames on both downlink and uplink have decoded successfully.

Yet in another aspect, the UEs 20*a* and 20*b* can use off-frames to perform inter-frequency measurements for other BSs without the need to be configured in compressed mode. For example, UE 20*a* may tune away to other frequencies during even-indexed DCH frames to listen for synchronization channel (SCH) transmissions from other BSs. In various aspects, a UE may be configured to perform inter-frequency measurements in any of the following time intervals: The time durations during which it does not receive the downlink DPDCH. The interval between the time instant of successful decode of all packets carried by a downlink DPDCH transmission and the time instant when the UE receiver must begin reception of the next packet carried on the downlink DPDCH. The interval between the time instant of successful decode of all packets carried by both downlink and uplink DPDCH transmissions in a DCH frame, and the time instant when the UE receiver must begin reception of the next packet carried on the DL DPDCH.

In various aspects, the spreading factor used for the common OVSF code to be used by two users could be half of the spreading factor that would have been used if only one UE had been using the OVSF code. This preserves the total number of OVSF codes in use. In another aspect, the same spreading factor used for the case of a single user could be used, i.e., without halving. This halves the number of OVSF codes in use, at the expense of requiring more power for each UE. The above described aspects consider multiplexing of 2 UEs by halving their TTIs from 20 ms to 10 ms. 10 ms is the smallest DCH TTI in the current 3GPP standard, and further halving results in TTIs whose duration is not an integer number of slots. In one aspect, this concept can be modified to allow time-division multiplexing of more than 2 UEs as well. For example, 20 ms TTI contains 30 slots, which could be divided among 3 UEs getting 10 slots each, or 5 UEs getting 6 slots each, etc. In another aspect, the slots used by one UE could be consecutive, to allow more consecutive DRX time, or interlaced with slots used by other users. In another aspect, the slot format can be chosen to allow all UEs to send DPCCH bits (e.g., TPC) in every slot, in a manner similar to that shown in Table 1, and the spreading factor of the common spreading code can be chosen to meet a desired puncturing ratio for each UE. In another aspect, the interleaving and rate-matching algorithm used by the base station 10 can be modified to account for the new maximum number of available slots per user and DPDCH bits for each packet (depending on slot-format). For example, the first interleaver and radio-frame segmentation assume a TTI of 10 ms, and the second interleaver uses a possibly different number of columns and a correspondingly different column permutation than used by the current 3GPP 30 column second-interleaver; for example, the number of columns could equal the number of slots allocated to each user in a 20 ms window.

Figure 5:
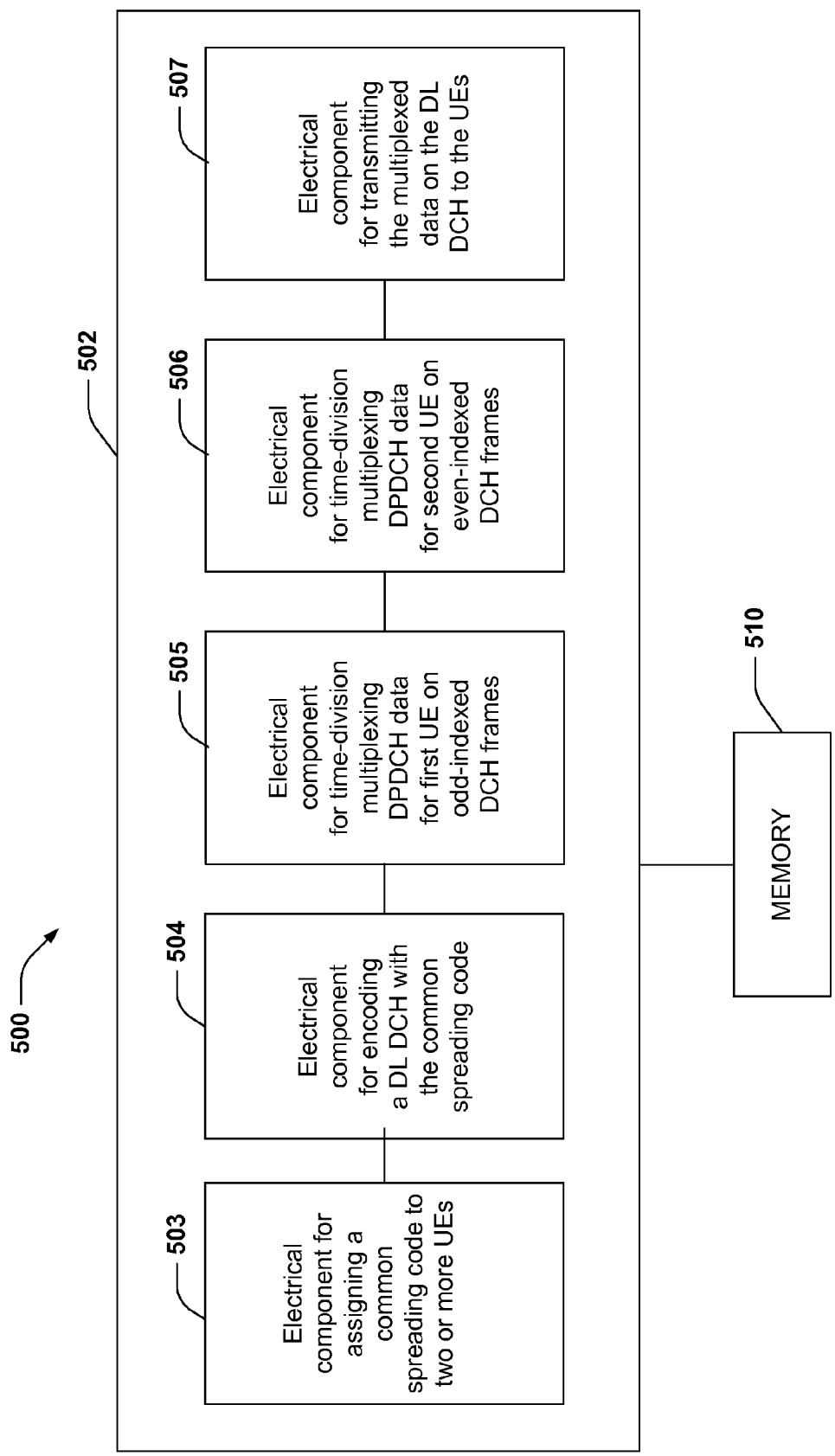
FIG. 5 is a block diagram illustrating an example system for of time-division multiplexing of the DCH according to one aspect.

FIG. 5 illustrates a system 500 for time-division multiplexing of the DCH according to one aspect. For example, system 500 can be implemented in a base station, such as BS 10 of FIG. 1. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component 503 for assigning a common spreading code to two or more UEs. Further, logical grouping 502 can include an electrical component 504 for encoding a DL DCH with the common spreading code. Further, logical grouping 502 can comprise an electrical component 505 for time-division multiplexing DPDCH data for first UE on odd-indexed DCH frames. Further, logical grouping 502 can include an electrical component 506 for time-division multiplexing DPDCH data for second UE on even-indexed DCH frames.

Additionally, system 500 can include a memory 510 that retains instructions for executing functions associated with the electrical components 504-507. While shown as being external to memory 510, it is to be understood that one or more of the electrical components 504-507 can exist within memory 510. In one example, electrical components 504-507 can comprise at least one processor, or each electrical component 504-507 can be a corresponding module of at least one processor. Moreover, in an additional or alternative example, electrical components 504-507 can be a computer program product comprising a computer readable medium, where each electrical component 504-507 can be corresponding code.

Figure 6:
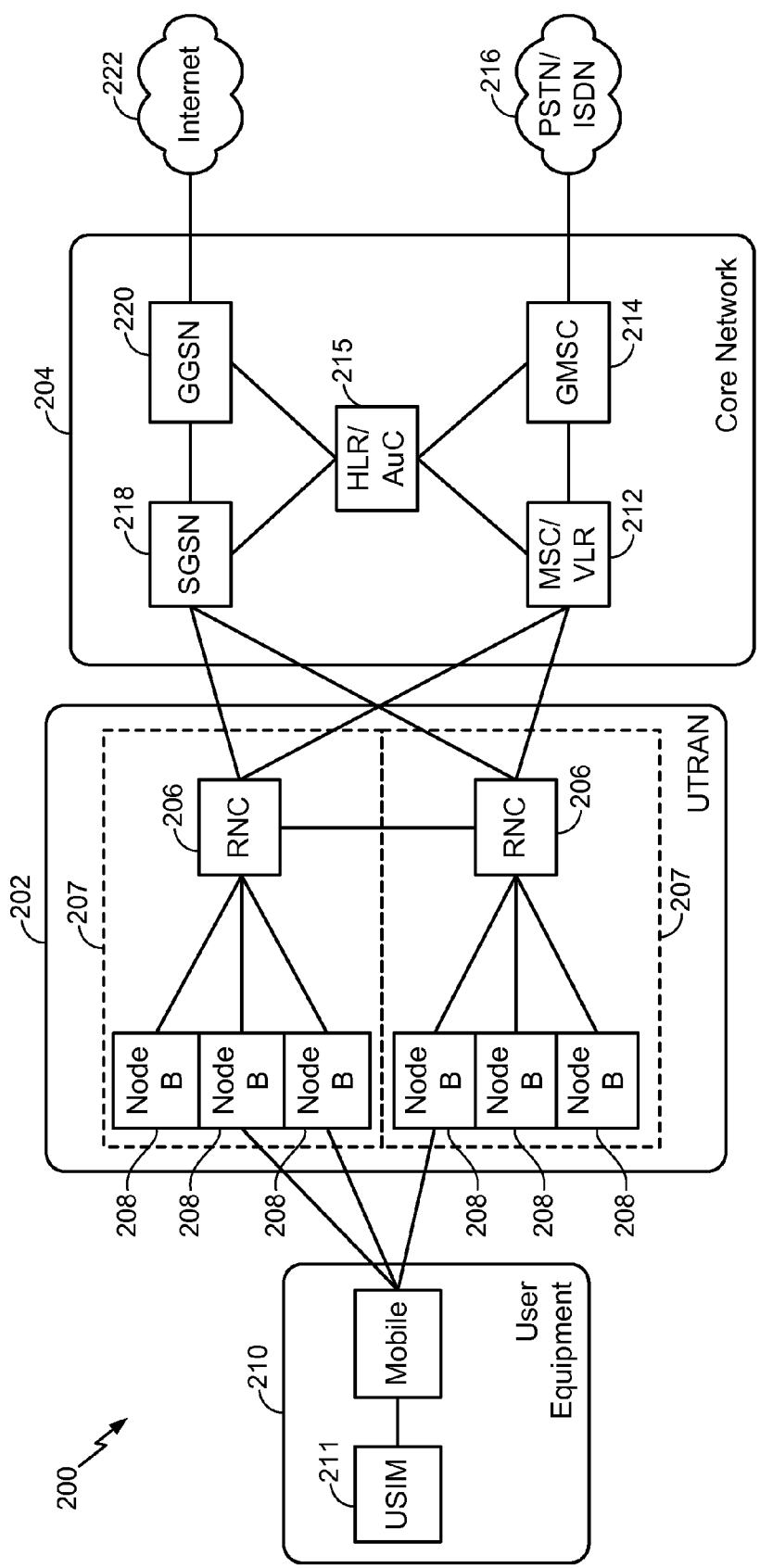
FIG. 6 is a block diagram conceptually illustrating an example of a telecommunications system.

The various aspects, the apparatus and methods for time-division multiplexing of a dedicated channel presented throughout this disclosure may be implemented across a broad variety of telecommunication systems, network architectures, and communication standards. By way of example and without limitation, the aspects of the present disclosure illustrated in FIG. 6 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. In one aspect, RNC 206 may include a DCH manager 11 of FIG. 1. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. In one aspect, Node B 208 may include a DCH manager 11 and/or communication module 16 of FIG. 1. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210. Examples of the UE 210 include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
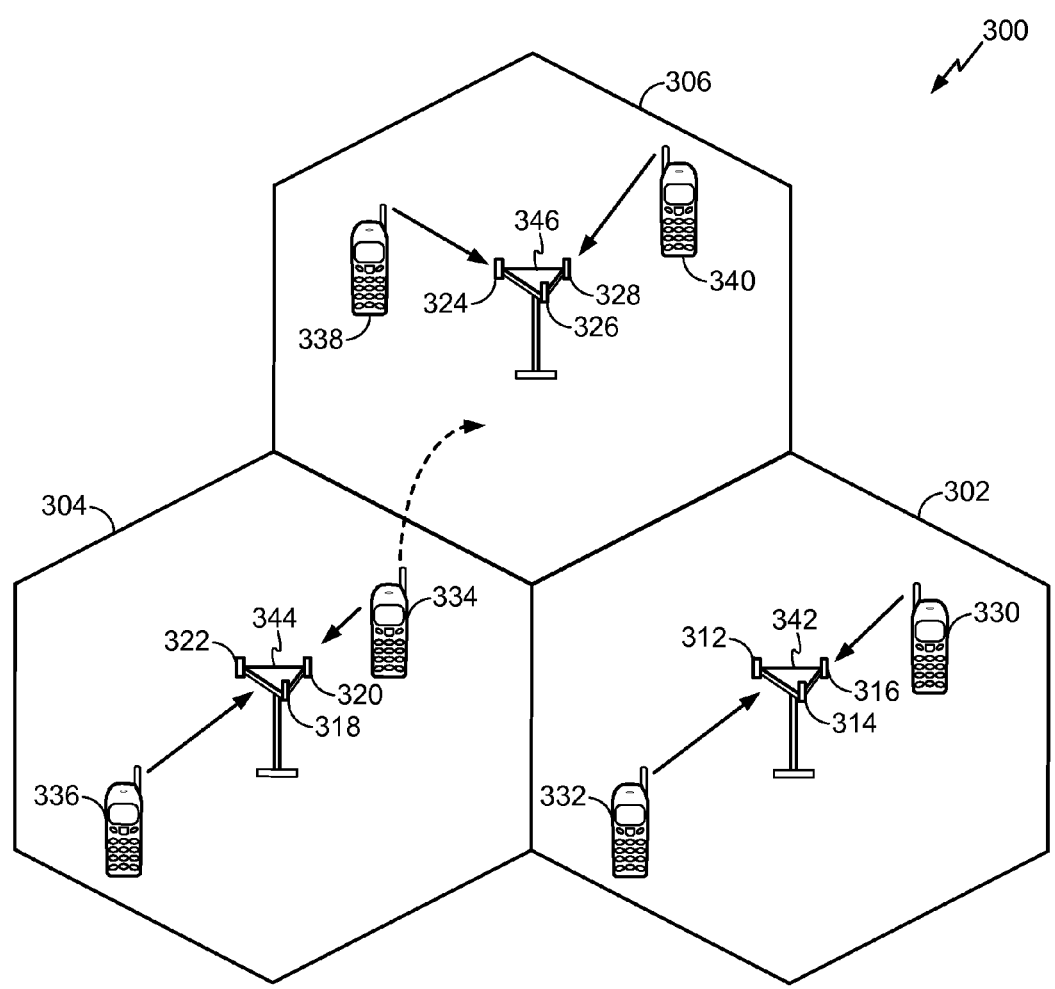
FIG. 7 is a conceptual diagram illustrating an example of an access network.

FIG. 7 illustrates an access network 300 in a UTRAN architecture in which apparatus and methods for time-division multiplexing of a dedicated channel disclosed herein may be implemented. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., UEs, such as UEs 20A and 20B of FIG. 1, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 6) for all the UEs 330, 332, 334, 336, 338, 340 in the respective cells 302, 304, and 306. In one aspect, Node B 342, 344, 346, may be base stations 10 in FIG. 1, which include DCH manager 11 and communication module 16 configured to perform time-division multiplexing of a dedicated channel and other aspects disclosed herein As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 6), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
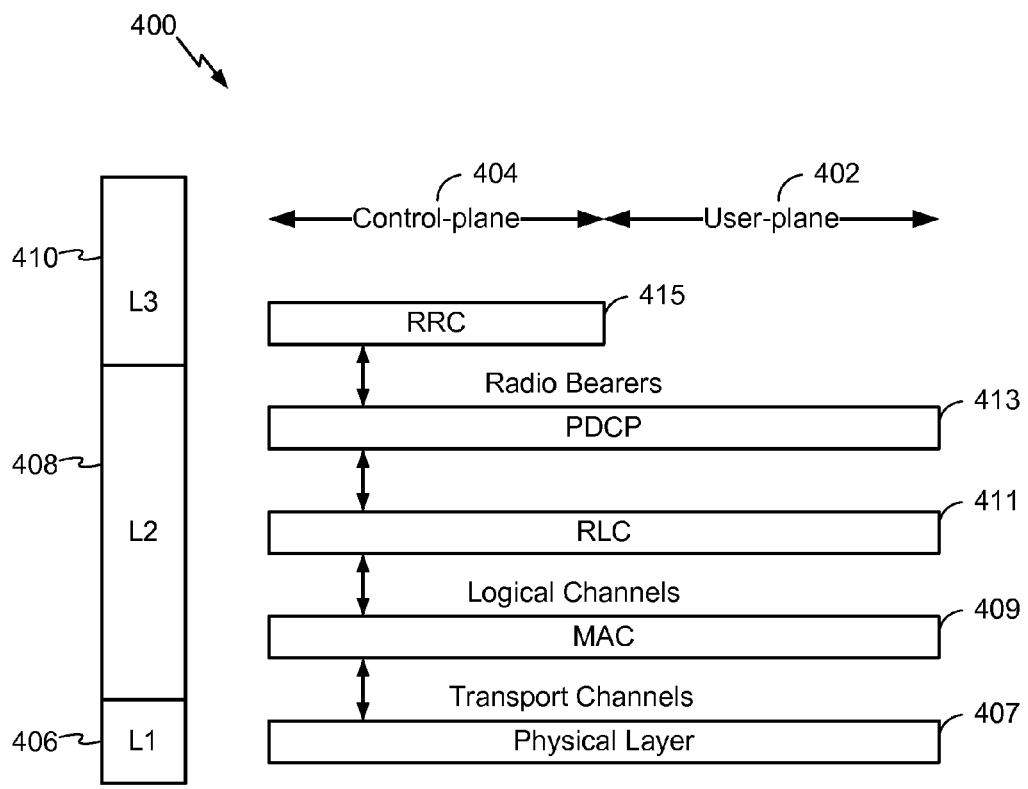
FIG. 8 is a conceptual diagram illustrating an example of a radio protocol architecture for the user and control plane.

The radio protocol architecture may take on various forms depending on the particular application. An example for an HSPA system will now be presented with reference to FIG. 8. As shown, an example radio protocol architecture 400 relates to the user plane 402 and the control plane 404 of a UE, such as UE 20A or 20B of FIG. 1 or node B/base station, such as BS 10 of FIG. 1. The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 9:
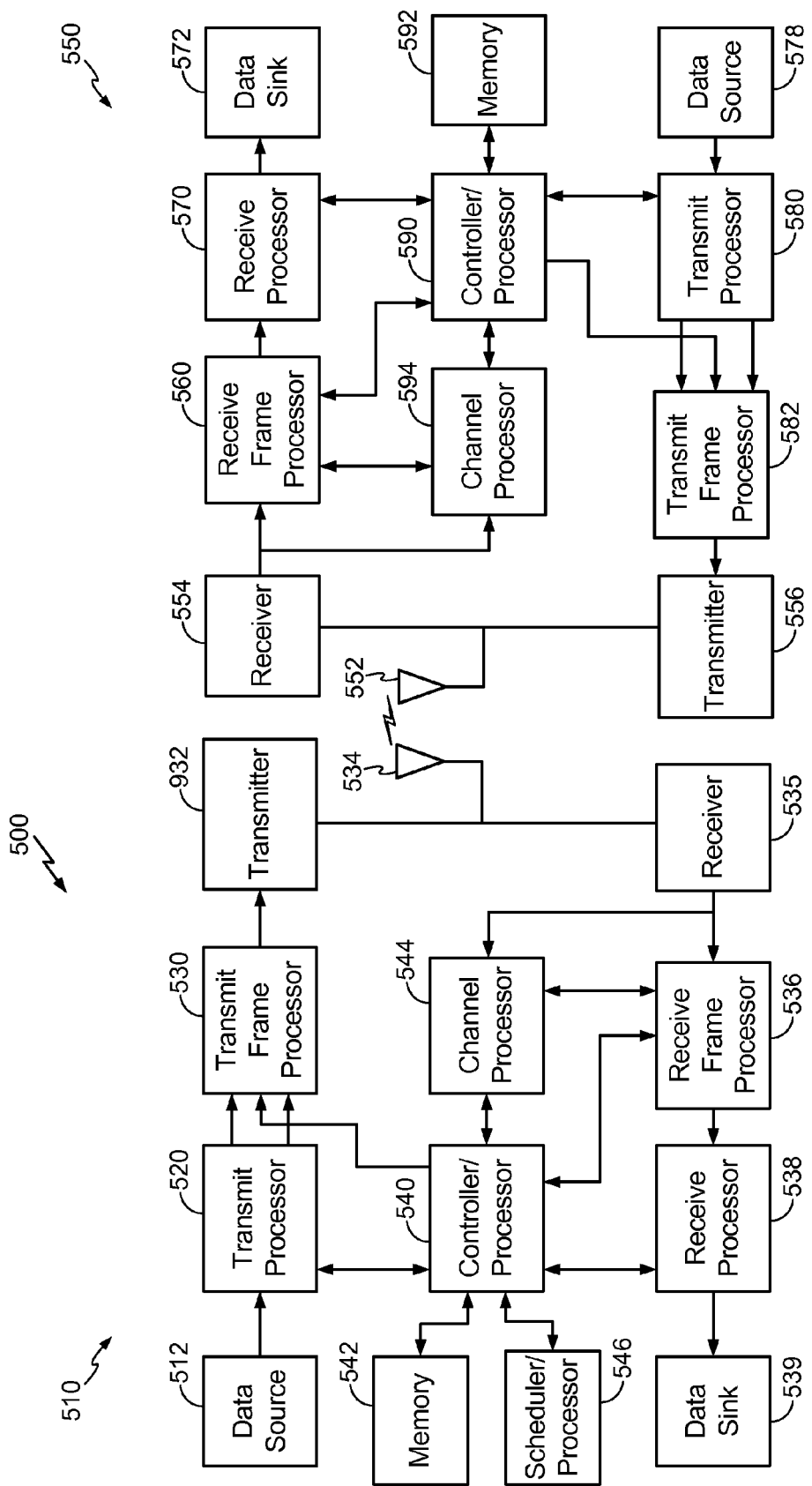
FIG. 9 is a block diagram conceptually illustrating an example of a Node B in communication with a UE in a telecommunications system.

FIG. 9 is a block diagram of a Node B 510, in communication with a UE 550, where the Node B 510 may be the Node B 208 in FIG. 6 or BS 10 of FIG. 1, and the UE 550 may be the UE 210 in FIG. 6 or UE 20A or UE 20B of FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
assigning a common spreading code to two or more User Equipments (UEs);
encoding a downlink (DL) dedicated channel (DCH) with the common spreading code;
time-division multiplexing a Dedicated Physical Data Channel (DPDCH) data for each of two of the two or more UEs on the DL DCH encoded with the common spreading code on alternate DCH frames, the time-division multiplexing further including:
multiplexing a first DPDCH data for a first UE of the two UEs on odd-indexed DCH frames, and
multiplexing a second DPDCH data for a second UE of the two UEs on even-indexed DCH frames; and
transmitting the multiplexed data on the DL DCH to the two or more UEs.

2. The method of claim 1, wherein time-division multiplexing further includes multiplexing the DPDCH data for each of three or more of the two or more UEs on sequential DCH slots or on interlaced DCH slots.

3. The method of claim 1, wherein the spreading code includes an Orthogonal Variable Spreading Factor (OVSF) code.

4. The method of claim 1 further comprising: configuring each of the two or more UEs to turn off the DPDCH reception during DCH frames in which DPDCH data is not transmitted to that UE.

5. The method of claim 1 further comprising: time-division multiplexing a Dedicated Physical Control Channel (DPCCH) data for each of the two or more UEs with the DPDCH data using the common spreading code.

6. The method of claim 5, wherein the DPCCH data bits of different UEs carried in the same slot are carried by time-division multiplexing, I-Q multiplexing, or a combination of time-division multiplexing and I-Q multiplexing.

7. The method of claim 5 further comprising: configuring the DPCCH of each of the two or more UEs on a fractional channel F-DPCH.

8. The methods of claim 5, wherein the DPCCH includes only Uplink (UL) Power Control (TPC) bits.

9. The method of claim 1 further comprising: performing one or more of early decoding of voice frames on DL channels at a UE receiver and early decoding of voice frames on UL channels at a base station (BS) receiver.

10. The method of claim 9 further comprising: receiving an acknowledgement at the BS when the UE receiver successfully decodes a packet.

11. The method of claim 9 further comprising: signalling an acknowledgement to the UE when the BS receiver successfully decodes a packet.

12. The method of claim 9 further comprising: turning off the BS receiver and a BS transmitter when the voice frames on both the DL and UL channels were decoded successfully.

13. The method of claim 1, further comprising: configuring, by a BS, a UE of the two or more UEs to perform inter-frequency measurements during one or more of:
    time intervals during which the UE does not receive a DL DPDCH transmission;
    a time interval between a time instant of successful decoding of all packets carried by the DL DPDCH transmission and a time instant when a receiver of the UE begins reception of the next packet carried on the DL DPDCH; and
    a time interval between a time instant of successful decoding of all packets carried by DL and UL DPDCH transmissions in a DCH frame and the time instant when the UE receiver begins reception of the next packet carried on the DL DPDCH.

14. The method of claim 1 further comprising: selecting a slot-format to accommodate DPCCH bits from all the time-division multiplexed UEs on every slot or DPCCH bits from each UE on a pre-configured subset of slots.

15. The method of claim 1, wherein a spreading factor of the common spreading code is chosen to meet desired puncturing ratios for each UE.

16. The method of claim 1 further comprising: selecting an interleaving and rate-matching algorithm based on the number of available slots and DPDCH bits for each packet.

17. An apparatus for wireless communication, comprising:
    a spreading code assignor configured to assign a common spreading code to two or more User Equipments (UEs);
    an encoder configured to encode a downlink (DL) dedicated channel (DCH) with the common spreading code;
    a multiplexer configured to time-division multiplex a Dedicated Physical Data Channel (DPDCH) data for each of two of the two or more UEs on the DL DCH encoded with the common spreading code on alternate DCH frames, the multiplexer further configured to:
        multiplex a first DPDCH data for a first UE of the two UEs on odd-indexed DCH frames, and
        multiplex a second DPDCH data for a second UE of the two UEs on even-indexed DCH frames; and
    a transmitter configured to transmit the multiplexed data on the DL DCH to the two or more UEs.

18. The apparatus of claim 17, wherein the multiplexer is further configured to multiplex the DPDCH data for each of three or more of the two or more UEs on sequential DCH slots or on interlaced DCH slots.

19. The apparatus of claim 17, wherein the multiplexer further is configured to multiplex a Dedicated Physical Control Channel (DPCCH) data for each of the two or more UEs with the DPDCH data using the common spreading code.

20. An apparatus for wireless communication, comprising:
    a processor configured to:
    assign a common spreading code to two or more User Equipments (UEs);
    encode a downlink (DL) dedicated channel (DCH) with the common spreading code;
    time-division multiplex a Dedicated Physical Data Channel (DPDCH) data for each of two of the two or more UEs on the DL DCH encoded with the common spreading code on alternate DCH frames, wherein the processor is further configured to:
    multiplex a first DPDCH data for a first UE of the two UEs on odd-indexed DCH frames, and
    multiplex a second DPDCH data for a second UE of the two UEs on even-indexed DCH frames; and
    transmit the multiplexed data on the DL DCH to the two or more UEs; and
    a memory coupled to the processor.

21. The apparatus of claim 20, wherein the means for time-division multiplexing further include means for multiplexing the DPDCH data for each of three or more of the two or more UEs on sequential DCH slots or on interlaced DCH slots.

22. The apparatus of claim 20, wherein the means for time-division multiplexing further include means for multiplexing a Dedicated Physical Control Channel (DPCCH) data for each of the two or more UEs with the DPDCH data using the common spreading code.

23. A non-transitory computer-readable medium comprising codes for:
    assigning a common spreading code to two or more User Equipments (UEs);
    encoding a downlink (DL) dedicated channel (DCH) with the common spreading code;
    time-division multiplexing a Dedicated Physical Data Channel (DPDCH) data for each of two of the two or more UEs on the DL DCH encoded with the common spreading code on alternate DCH frames, the time-division multiplexing further including:
        multiplexing a first DPDCH data for a first UE of the two UEs on odd-indexed DCH frames, and
        multiplexing a second DPDCH data for a second UE of the two UEs on even-indexed DCH frames; and
    transmitting the multiplexed data on the DL DCH to the two or more UEs.

24. The medium of claim 23, wherein the code for time-division multiplexing further includes code for multiplexing the DPDCH data for each of three or more of the two or more UEs on sequential DCH slots or on interlaced DCH slots.

25. The medium of claim 23, wherein the code for time-division multiplexing further includes code for multiplexing a Dedicated Physical Control Channel (DPCCH) data for each of the two or more UEs with the DPDCH data using the common spreading code.

* * * * *